(12) United States Patent
Hund et al.

(10) Patent No.: US 11,808,295 B2
(45) Date of Patent: Nov. 7, 2023

(54) FIXING DEVICE

(71) Applicant: Spieth-Maschinenelemente GmbH & Co. KG, Esslingen (DE)

(72) Inventors: Alexander Hund, Aichwald (DE); Christian Kienle, Stuttgart (DE)

(73) Assignee: SPIETH-MASCHINENELEMENTE GMBH & CO. KG, Esslingen (DE)

( * ) Notice: Subject to any disclaimer, the term of this patent is extended or adjusted under 35 U.S.C. 154(b) by 535 days.

(21) Appl. No.: 17/044,458

(22) PCT Filed: Apr. 9, 2019

(86) PCT No.: PCT/EP2019/058907
§ 371 (c)(1),
(2) Date: Oct. 1, 2020

(87) PCT Pub. No.: WO2019/201666
PCT Pub. Date: Oct. 24, 2019

(65) Prior Publication Data
US 2021/0040980 A1    Feb. 11, 2021

(30) Foreign Application Priority Data

Apr. 20, 2018    (DE) .................... 10 2018 003 247.8

(51) Int. Cl.
*F16B 39/286*    (2006.01)
*F16B 39/02*    (2006.01)
(Continued)

(52) U.S. Cl.
CPC .......... *F16B 39/286* (2013.01); *F16B 39/028* (2013.01); *F16B 37/00* (2013.01); *F16B 39/12* (2013.01)

(58) Field of Classification Search
CPC ...... F16B 39/028; F16B 39/286; F16B 37/00; F16B 39/12; F16B 39/284
(Continued)

(56) References Cited

U.S. PATENT DOCUMENTS

| 578,194 A | * | 3/1897 | Barser ..................... F16B 39/12 |
| | | | 411/956 |
| 678,680 A | * | 7/1901 | Nash ....................... F16B 39/12 |
| | | | 411/222 |

(Continued)

FOREIGN PATENT DOCUMENTS

| DE | 30 20 521 | 12/1981 |
| DE | 35 21 563 | 1/1986 |

(Continued)

OTHER PUBLICATIONS

International Search Report (ISR) dated Jul. 31, 2019 in corresponding International Application No. PCT/EP2019/058907.

*Primary Examiner* — Victor D Batson
*Assistant Examiner* — Dil K. Magar
(74) *Attorney, Agent, or Firm* — WENDEROTH, LIND & PONACK, L.L.P.

(57) ABSTRACT

A fixing device has two threaded rings (10, 12), and aa membrane (14) held between them that is an integral part of this pair of rings (10, 12) and is kept at a distance from the rings (10, 12) by introduced slots (16, 18, 24, 26), rectilinear in a unmounted state. The slots open to the outside. By resting against only partially annularly extending webs (20, 22) and having a clamping bolt (30) usable to adjust the axial distance between the and passing through the membrane (14) between two adjacent webs (20, 22), in the unmounted state the membrane is oriented in an undeformed manner in parallel to the rings (10, 12) and in a mounted state it is moved between the webs (20, 22) in a deformed state in the direction of at least one of the rings to at least partially form (Continued)

a slanted or arc course, as soon as the distance (a) between a pair (10, 12) of rings (10, 12) is reduced by the clamping bolt. The clamping bolt (30) passes through adjacent slots (16, 18, 24, 26) separated from the membrane (14).

20 Claims, 2 Drawing Sheets

(51) Int. Cl.
*F16B 37/00* (2006.01)
*F16B 39/12* (2006.01)

(58) Field of Classification Search
USPC .......... 411/433, 285–286, 288, 290, 11, 150, 411/544
See application file for complete search history.

(56) References Cited

U.S. PATENT DOCUMENTS

| | | | | |
|---|---|---|---|---|
| 2,391,712 | A * | 12/1945 | King | B23G 9/006 |
| | | | | 411/291 |
| 3,631,910 | A * | 1/1972 | Crowther | F16B 39/24 |
| | | | | 411/149 |
| 3,890,876 | A * | 6/1975 | Dahl | F16B 31/028 |
| | | | | 470/45 |
| 4,161,509 | A * | 7/1979 | Nowak | F01N 3/2875 |
| | | | | 60/299 |
| 4,571,133 | A * | 2/1986 | Lindow | F02F 7/006 |
| | | | | 411/150 |
| 4,864,443 | A * | 9/1989 | Peterson | G11B 17/0282 |
| 4,941,787 | A * | 7/1990 | Shaffer | F16B 35/048 |
| | | | | 411/150 |
| 5,662,445 | A * | 9/1997 | Harbottle | F16C 25/06 |
| | | | | 411/290 |
| 5,984,602 | A * | 11/1999 | Park | F16B 39/284 |
| | | | | 411/545 |
| 6,152,665 | A * | 11/2000 | Wallace | F16B 31/028 |
| | | | | 411/161 |
| 6,212,917 | B1 * | 4/2001 | Rathbun | D06B 5/16 |
| | | | | 411/433 |
| 7,857,562 | B2 * | 12/2010 | Wallace | F16B 31/028 |
| | | | | 411/13 |
| 2011/0188970 | A1 * | 8/2011 | Dillon | F16B 39/12 |
| | | | | 411/433 |
| 2012/0104120 | A1 * | 5/2012 | Holt | F16F 1/328 |
| | | | | 239/533.2 |
| 2015/0240856 | A1 * | 8/2015 | Watanabe | F16B 39/028 |
| | | | | 411/1 |
| 2016/0312818 | A1 * | 10/2016 | Hund | F16B 33/06 |
| 2016/0327084 | A1 * | 11/2016 | Hund | F16B 39/028 |
| 2017/0356874 | A1 * | 12/2017 | Nakamura | G01N 27/409 |

FOREIGN PATENT DOCUMENTS

| | | | | |
|---|---|---|---|---|
| DE | 0794338 | A1 * | 3/1996 | ............... F16B 37/00 |
| DE | 102014019266 | A1 * | 6/2016 | ............... F16D 3/72 |
| EP | 0 794 338 | | 9/1997 | |
| FR | 2566483 | A1 * | 6/1984 | ............. F16B 39/02 |
| FR | 2 566 483 | | 12/1985 | |
| FR | 2 743 121 | | 7/1997 | |
| GB | 489885 | | 8/1938 | |

* cited by examiner

FIXING DEVICE

FIELD OF THE INVENTION

The invention relates to a fixing device having at least two threaded rings, which between them hold a membrane, which is an integral part of this pair of rings and which is kept at a distance from the rings by introduced slots. The slots are rectilinear in a unmounted state, all open to the outside into the environment. By resting against only partially annularly extending webs and by having at least one clamping screw, t the axial distance between the rings can be adjusted.

BACKGROUND OF THE INVENTION

Fixing devices are known in various configurations to attach construction, machine and equipment parts to each other and secure them in their relative positions. EP 0 794 338 A1 discloses a fixing device having a base body, in which a rectilinear, annular inner groove and further a rectilinear, annular outer groove have been introduced. The grooves introduced in the manner of punctures divide the fixing device into two threaded rings, which are interconnected by a membrane and of which one ring is used as an adjusting nut and the other ring as a lock nut. Annular, concentrically arranged webs, which radially delimit the grooves on the inside or on the outside, are used to connect the membrane to the respective threaded rings and to attach the membrane to the respective threaded rings. To that extent, the membrane is an integral part of the pair of rings. In the axial direction, several clamping bolts distributed along the diameter are introduced into the pair of rings and extend through both grooves and the radially circumferential membrane arranged therebetween, while bypassing the webs.

The fixing device provided with a female thread is used, for instance, to mount and secure a machine part, such as a bearing, on a spindle holder or the like on an associated male thread thereof. Alternately, the use of a fixing device having a male thread is conceivable, for example, in the form of a screw, which can be mounted and secured to a component using the associated female thread of the component. The clamping bolts are used to interlock the two threaded rings with each other, such that the fixing device can be secured by screwing to a threaded bolt or a similar component having a male thread, thereby eliminating the joining or thread flank play. The membrane is closed in an axial direction towards the adjusting nut without plastic deformation by the lock nut, and the securing forces generated across the uniformly deformed ring membrane are superimposed by the operating load in the fixed state of the device in the same direction of force, such that in operation the forces are added and achieve a secure connection. Especially for fixing devices having threaded pairs of rings having a small diameter, the introduction of the internal puncture from the inside causes problems, which significantly increases the manufacturing cost of the known solution.

To simplify manufacture and to improve the clamping effect, DE 30 20 521 A1 discloses a fixing device having slots introduced from the outside in the radial direction, which continuously divide the ring body in two threaded rings from outside to inside. A complex introduction of grooves having a predetermined penetration depth is eliminated, as the ring body is completely severed thereby forming individual ring segments. In this fixing device of the type mentioned above, at least two threaded rings between them hold a membrane, which is an integral part of this pair of rings and which is kept at a distance from the rings by introduced slots, rectilinear in a unmounted state, which all open to the outside into the environment, and by resting against only partially annularly extending webs. The axial distance between the rings can be adjusted using two or more clamping bolts.

In the fixing device thus formed, two or three slots or rows of slots are arranged staggered in the axial direction. The individual webs arranged between the circumferentially extending slots act as joints, to prevent a canting of the threaded rings during the fixing of the threaded rings. The slots are used as points of passage for the clamping bolts introduced into the pair of rings. The webs intersected by the clamping bolts result in a stiffening of these joints and then unintentionally in a restriction of the mobility of the membrane between adjacent slots, resulting in a reduction of the securing forces. This deficiency has already been recognized in the cited patent application publication and, in a further embodiment it has accordingly been proposed to arrange the slots in an arc shape between the threaded rings from the beginning to form balance-shaped beams.

The introduction of arcuate slots in the unmounted state of the known fixing device in turn generates an increased complexity of manufacture and does not eliminate the problem of stiffened joints across the individual fixing webs penetrated by clamping bolts. Rather, due to the arcuate arrangement of the respective penetration slots, a spring back effect can be observed for the membrane parts between two penetrated fixing webs, which effect additionally impedes the desired free deformation of the membrane in order to obtain increased securing forces. In particular, in the case of threaded ring designs of small build, the known solution has proved to be less suitable due to the spring back effects described.

SUMMARY OF THE INVENTION

Based on this prior art, the invention addresses the problem of improving the known solutions, in particular to avoid the disadvantages in the prior art described above.

This problem is basically solved by a fixing device having at least one clamping bolt passing through a membrane (i.e., a pliable layer or thin metal sheet section), connecting the rings as part of a one-piece design, between two adjacent webs. In the unmounted state, the membrane is oriented in an undeformed manner in parallel to the rings. In a mounted state, the membrane is moved between the webs in a deformed state in the direction of at least one of the rings to at least partially form a slanted or arc course, as soon as the distance between a pair of rings is reduced by the relevant assignable clamping bolt. At least one clamping bolt passing through the membrane passes through adjacent slots, which are separated from the membrane.

Due to the fact that at least one clamping bolt passes through the membrane and the slots running or extending on both sides, any material weakening of the webs is avoided by a corresponding through-hole, and the interconnection of the threaded rings separated from each other by the slots and connected by the webs in a captive and integral manner is reinforced. The respective clamping bolts are preferably inserted centrally between two adjacent webs in the pair of rings, and due to the passage through the membrane makes for an improved force input and an easier deformation of the slots during mounting. When tightening the individual clamping bolts, which successively pass through a threaded ring, a slot, the membrane, the other slot and the other threaded ring or engage with the other threaded ring, the two threaded rings are moved towards each other such that the slots previously aligned in parallel to the rings are at least partially oriented following a slanted or arc course. In this context, it would also be conceivable that in certain embodiments, a portion of the clamping bolts used, as shown in the prior art, pass through the webs between the two rings.

Preferably, the arrangement according to the invention is made such that the membrane forms a wave-shaped or undulating membrane in the fixed or mounted state of the pair of threaded rings. The resulting deformation of the membrane extends beyond the clamping point having the fixing web. The fixing web in that way does not interrupt the desired free wave or arc course. For an average person skilled in the art of such fixing devices, it was surprising that the solution according to the invention makes for a much-improved distribution of forces in the wave-shaped deformed membrane, which results in increased securing forces and in an improved force superposition during the operation of the device. The membrane to be deformed can adapt free of play in the manner of a cantilever, which results in the desired effects. This is without parallel in the prior art.

The fixing device is preferably formed as a whole from a metal material, a plastic or a combination of materials of metal material and plastic. More preferably, the rings resume their original position upon loosening the at least one clamping bolt and the slots, and the intermediate membrane is again straight and aligned in parallel to the rings. It shall be understood that, in the axial direction, successively more than two slots can be introduced between the two threaded rings, and more than two threaded rings can be formed and can be assigned to each other in pairs. According to the invention, at least one inserted clamping bolt passes through at least one membrane as well as through the slots separated from one another and arranged adjacent to each other in the axial direction. Particularly preferably, the respective clamping bolts pass through all slots successively arranged along the axial extent and the membrane without the passage of a web. The solution according to the invention also includes the use of only one clamping bolt, which is screwed into the rings for adjusting the axial distance between the rings and passes through the membrane between two adjacent webs. Generally, however, two or more clamping bolts are screwed into the threaded rings.

In a preferred embodiment of the fixing device according to the invention, the membrane has a plate, the thickness of which in its undeformed state equals to or is smaller than a slot width. This thickness results in the advantage of a low thickness of the membrane on one side of the adjacent slots, which can easily be deformed in this way to form slanted and arc courses. While aimed at saving space, the slots are advantageously designed as narrow as possible, i.e. formed having a small width at the fixing device. A plastic deformation of the membrane due to an excessively low material thickness is to be avoided. Occasionally the membrane thickness is then greater than the width of the immediately adjacent slots. Preferably, the respective slot has a rectangular cross-section viewed in the radial direction. A form deviating therefrom is conceivable, for instance, with top and bottom sides slanted with respect to a plane perpendicular to the longitudinal axis or a curved, in particular concave, end side between the top and bottom sides. The end sides of the respective slots are preferably arranged to extend in parallel to the longitudinal axis of the threaded rings.

It is also advantageous that the respective slots are introduced continuously from the outside to the inside between two adjacent webs of a ring on the outer peripheral side by sawing. This introduction results in the advantage of a simple manufacture of precisely manufactured slots and of the membrane separating them from each other. In a simple and cost-effective way, slots can also be introduced in small thread sizes and the fixing device can be produced in large quantities.

In a further preferred embodiment of the fixing device according to the invention, the slots extend in an alternating manner, at one time assigned to one ring, at another time assigned to the other ring between the membrane and an adjacent ring and between two of its adjacent webs. This slot arrangement allows a uniform transfer of force when tightening the one or more clamping bolts, of which at least one is introduced into a ring segment according to the invention, in which ring segment two adjacent slots are separated from each other solely by the membrane arranged therebetween. Viewed in the circumferential direction, these ring segments are each formed having a length that at least permits a clamping bolt to be introduced to penetrate the membrane arranged there.

In a preferred embodiment of the fixing device according to the invention, the membrane oriented in parallel to the rings in the unmounted state is deformed by the clamping force input of the at least one clamping bolt for reducing the distance between the rings such that the membrane undulates in the mounted state, in particular has a uniform wave shape along the ring shape of the pair of rings. Due to the undulating, wave-shaped course of the membrane in the mounted state, the same axial distance is set between the threaded rings due to a uniform application of force of the one or more clamping bolts on the pair of rings. The membrane is arranged in the unmounted state in a plane perpendicular to the longitudinal axis and can be at least partially slanted, in particular twisted, relative to this plane during deformation. When using the fixing device, the improved distribution of forces results in an improved force superposition and an increase in the overall securing forces. The best possible distribution of forces and transmission is affected by a preferably complete, uninterrupted deformation of the membrane.

In a further preferred embodiment of the fixing device according to the invention, the membrane is divided into sections between two adjacent webs of a pair of rings and has an alternately rising and falling slanted or arc course between two adjacent webs in the mounted, deformed state. Due to the sequence of alternately rising and falling slanted or arc courses, a uniform clamping of the two threaded rings is affected and their sequential positions are stabilized. Particularly preferably, the pairwise rising and falling slanted or arc courses are formed complementing each other. The individual slanted or arc course is formed uniformly along the entire length having the same inclination or the same curvature, alternatively, several, at least two, sections are formed having different inclinations or curvatures along their respective courses.

Advantageously, in a ring assembly having two clamping bolts, there are two slots, in the case of three clamping bolts, there are three slots, in the case of four clamping bolts, there are four slots, etc. The clamping bolts each pass through two adjacent slots in annular segments provided along the circumferential direction of the threaded rings, Each slot is advantageously penetrated by at least one, preferably two, clamping bolts. This penetration results in the advantage that, based on the smallest number of individual parts possible, a deformation of each slot on the pair of rings is implemented. A secure clamping of the two threaded rings is achieved in this particular embodiment based on simplified installation effort.

In a further preferred embodiment of the invention, in the mounted, deformed state of the membrane, the smallest distance between a web of a ring, on which the membrane is articulated, and the opposite ring, is at this point. As a result, a deformation behavior of the pair of rings is specified. The slots are each slanted or bent along their entire lengths.

It is also advantageous that at least one pair of rings has a continuously arranged female thread on its inner peripheral side, the pitches of which threads being preferably equal. The membrane has a free inner diameter, which matches at least the relevant thread diameter, but is preferably selected to be larger. In this way, a secure and firm connection of the fixing device to a machine, structure or piece of equipment having an associated male thread is made possible. A membrane recessed outwards in the radial direction relative to the female thread prevents possible adverse effects, such as an undesirable deformation of the membrane during the screwing and unscrewing of the part because the membrane does not come into contact with this part.

In a preferred embodiment of the fixing device according to the invention, one ring of a pair of rings is an adjusting nut and the other ring is a lock nut. The two threaded rings preferably have the same outer diameter. It is also conceivable, however, to provide different, in particular only to a small extent, divergent outer diameters. A threaded ring protruding in the radial direction provides a protection of the slots, preferably immediately adjacent to the threaded ring. The respective threaded rings are designed using a female thread. However, solutions having a male thread can also be implemented.

In a further preferred embodiment of the fixing device according to the invention, the slot widths of all slots are identical, and the at least one clamping bolt introduced from the free end face of the locking nut can be brought in engagement with the adjusting nut. As a result, a homogeneous structure and a uniform deformation of the slot arrangement are implemented. Several clamping bolts are preferably arranged distributed equidistantly at the front side of the lock nut, which results in a uniform force input when tightening the clamping bolts for clamping the two threaded rings and in the deformation of the annular membrane or the membrane segments arranged therebetween.

The above-mentioned and the further mentioned features can be implemented individually or in any desired combinations in a fixing device according to the invention.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are purely schematic and not to scale.

DETAILED DESCRIPTION OF THE INVENTION

Figure 1:
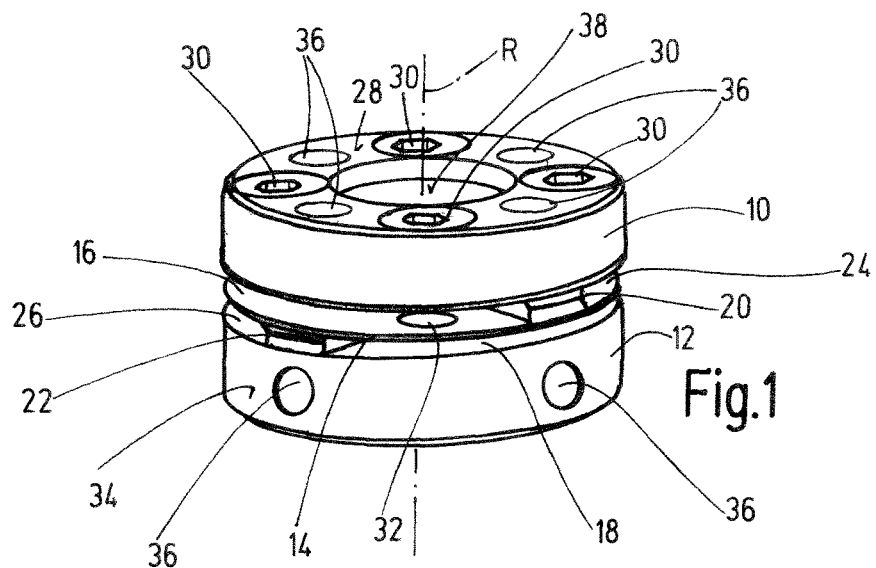
FIG. 1 is a perspective side view of a first exemplary embodiment of a fixing device according to the invention in the unmounted state.

FIG. 1 shows a perspective side view of a fixing device having a first threaded ring 10 and a second threaded ring 12, which are rotationally symmetrical to a longitudinal axis R and arranged in the axial direction along the longitudinal axis R in superposition as a pair of rings 10, 12. The two threaded rings 10, 12 hold an annular membrane 14 in the space between them. In the unmounted state of the fixing device shown in FIG. 1, the membrane 14 is arranged in a plane perpendicular to the longitudinal axis R. The fixing device has a total of four slots 16, 18, 24, 26 and four clamping bolts 30.

The membrane 14 separates two slots 16, 24 assigned to the first threaded ring 10 from two slots 18, 26 assigned to the second threaded ring 12. The slots 16, 18, 24, 26 open outwards into the environment in the radial direction adjoining the pair of rings 10, 12. The four slots 16, 18, 24, 26, extending in a straight line in parallel to the membrane 14, each extend into a ring segment of the pair of rings 10, 12 between two of four webs 20, 22, 48. The webs 20, 22, 48 each extend only partially annularly in sections along the circumference of the respective rings 10, 12 and are an integral part of the pair of rings 10, 12.

The first slot 16 extends along the circumference of the first ring 10 in a section from the first web 20 to a third web, not shown in the illustration of FIG. 1, which is diametrically opposite from the first web 20, and forms a complete opening in this section of the pair of rings 10, 12 from the outside to the inside. A third slot 24 adjoins the first web 20 on the other side, which slot is introduced into the first ring 10 and extends from the first 20 to the third web. Similarly, a fourth slot 26 adjoins the second web 22 in the circumferential direction, which slot is arranged on the second ring 12 and which extends, just like the second slot 18, from the second web 22 to a fourth web 48 (see FIG. 5) diametrically opposite, not shown in FIG. 1.

The membrane 14 rests on the webs 20, 22, 48, and is held at a distance from the two rings 10, 12 by the webs. The membrane 14 comprises a plate, the thickness of which, viewed in the axial direction, is in all three exemplary embodiments shown smaller than the width of the slots 16, 18, 24 and 26. The individual slots 16, 18, 24 and 26 are advantageously introduced continuously from the outside to the inside between two adjacent webs 20, 22, 48 of a ring 10, 12 on the outer peripheral side by sawing. Particularly preferably, the slot widths of all slots 16, 18, 24 and 26 are identical. This solution has advantages in terms of ease of manufacture and good functionality of the fixing device. Accordingly, all components such as slots, webs and rings are obtained from one single cylindrical hollow body by machining.

From a front side 28 of the first threaded ring 10 shown in FIG. 1, a total of four clamping bolts 30 are introduced in the axial direction, in parallel to the longitudinal axis R, into the pair of rings 10, 12. For improved illustration, only the heads of the clamping bolts 30 are shown in FIG. 1. The clamping bolts 30 extend through the first threaded ring 10 along its entire extent in the axial direction and at least partially through the second threaded ring 12 arranged at the bottom in the representation of FIG. 1. According to the invention, the point of passage of at least one, preferably all, clamping bolts 30 along the threaded rings 10, 12 are selected such that the at least one clamping bolt 30 passes through the membrane 14 between two adjacent webs 20, 22, 48. In FIG. 1, a passage opening 32 in the membrane 14 for the associated clamping bolt 30 is shown, the threaded portion of which is not shown for better illustration. Along the circumference of the pair of rings 10, 12, a passage opening in the first threaded ring 10, a passage opening 32 in the membrane 14 and an inlet opening in the second threaded ring 12 are formed for each of the clamping bolts 30. The openings 32 for the passage of the clamping bolt 30 assigned to a clamping bolt 30 are each arranged coaxially to an axis in parallel to the longitudinal axis R.

Figure 2:
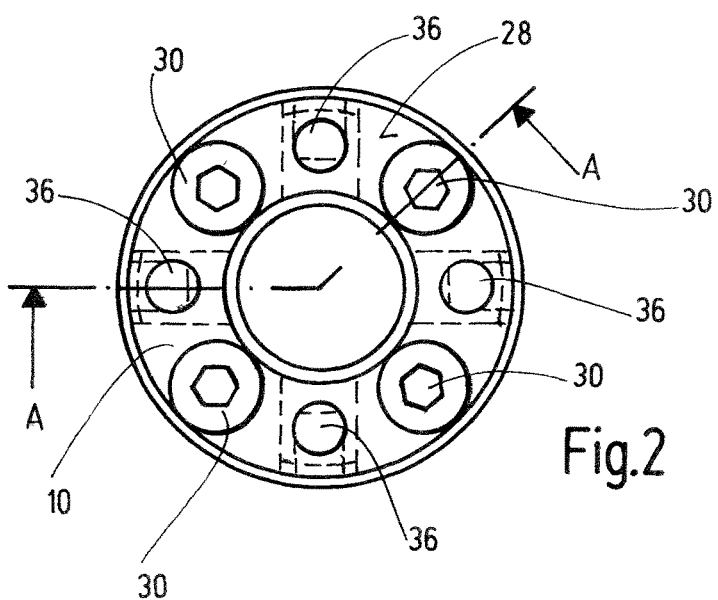
FIG. 2 is a top view from above of the fixing device of FIG. 1.

Several openings 36 are introduced into the end face 28 of the first threaded ring 10, of a second outer peripheral side 34 and of an end face of the second threaded ring 12, not shown in FIG. 1, which openings are used as points of attack for assembly tools for fixing and securing the pair of rings 10, 12 to a component. The plan view of FIG. 2 on the end face 28 of the first threaded ring 10 illustrates that the four clamping bolts and the four openings 36 are arranged alternately and with respect to the position of the relevant center—at regular intervals along the circumference of the threaded rings 10, 12.

On a radial inner peripheral side 38 of the threaded rings 10, 12, a continuously arranged female thread 52 (see FIG. 3) not shown in detail in FIG. 1 is formed. The slopes of the female threads are preferably identical. The membrane 14 has a free inner diameter, which matches at least the relevant thread diameter, but is preferably chosen to be larger. In the first embodiment shown in FIGS. 1 to 4, the first threaded ring 10 is an adjusting nut and the second threaded ring 12 is a lock nut. Alternatively, the clamping bolts 30 introduced from the free end face 28 of the first nut ring 10 designed as a lock nut are engaged with the second threaded ring 12 designed as an adjusting nut.

Figure 3:
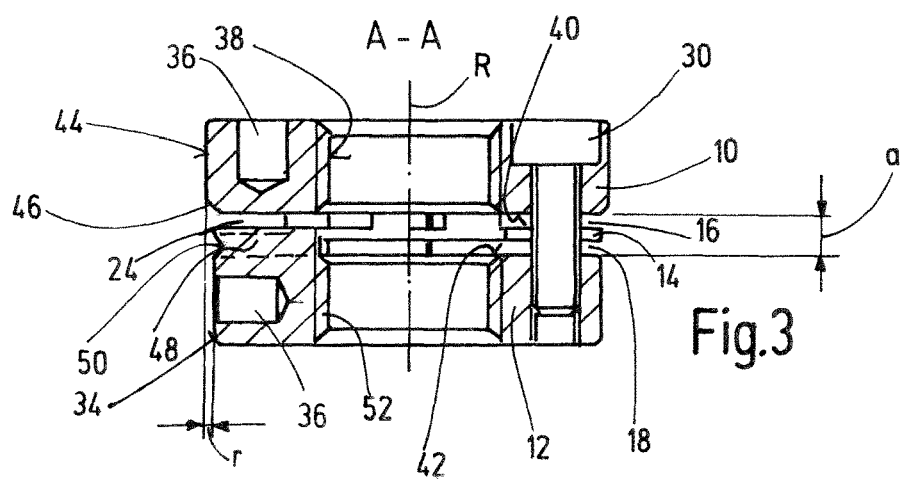
FIG. 3 is a side view in section through the fixing device of FIG. 2 taken along line A-A.

The cross-section shown in FIG. 3 through the pair of rings 10, 12 illustrates that the relevant clamping bolt 30 successively passes through the first threaded ring 10, the first 16 or third slot 24, the membrane 14, the second 18 or fourth slot 26 and then engages with the second threaded ring 12. The clamping bolts 30 can be used to set an axial distance a between the two rings 10, 12. The axial distance a is the distance measured between a first inside 40 delimiting the first slot 16 and the third slot 24 of the first threaded ring 10 and a second inside 42 delimiting the second slot 18 and the fourth slot 26 of the second threaded ring 12 in the direction of the longitudinal axis R.

FIG. 3 further illustrates that in the unmounted state shown, the undeformed membrane 14 is oriented in parallel to the rings 10, 12. In parallel to the rings 10, 12 formed in a rotationally symmetrical manner to the longitudinal axis R has the meaning arranged in a plane substantially perpendicular to the longitudinal axis R. FIG. 3 illustrates that the first threaded ring 10 has a slightly larger outer diameter than the second threaded ring 12 and accordingly the radial projection r projects opposite from the second threaded ring 12.

A circumferential chamfer 46 is formed at the edge to the two slots 16, 24 on a first outer peripheral side 44 of the first threaded ring 10, which chamfer is angled with respect to the first outer peripheral side 44 at an angle of preferably 40° to 60°, in the illustrated exemplary embodiment at an angle of 45°. The chamfer 46 and the associated deburring effectively prevent injuries when an operator grips the pair of rings 10, 12, and provide a fixing device free from residual contamination, which originate from the processing and formed to be nearly burr-free is achieved. In the machining production of the pair of rings 10, 12, the combination of slots 16, 18, 24, 26 with a circumferential chamfer 46 as a deburring permits an economically advantageous manufacturing method, because one deburring process results in the deburring on both the outside and the inside of two slots 16, 18, 24, 26.

Alternatively, a fixing device according to the invention can be manufactured using a primary molding process, such as a permanent molding process, for instance, using pressure die casting of non-ferrous metals, such as aluminum or zinc, or from a plastic material by injection molding. Sliders (not shown) for forming the slots 16, 18, 24, 26 are preferably integrated in the mold for performing the die casting or the injection molding, such that after removal of the mold together with slide, the fixing device is produced as a finished workpiece without undercuts having been formed. This optionally permits the complete manufacture of the fixing device in one manufacturing step in the mold or at least the production of a blank, which largely has its final contour, plus subsequent finishing, such as the insertion or broadening of the slots 16, 18, 24, 26 introduced or to be introduced into the rings 10, 12.

The sectional view of FIG. 3 is selected such that in addition to the passage of the clamping bolt 30 through two slots 16, 18, separated from the membrane 14, the arrangement of a slot 24 between the first threaded ring 10 and a fourth web 48 as part of the other second threaded ring 12 is shown. The fourth web 48 is arranged diametrically opposite from the second web 22, not shown in FIG. 3, (cf. FIG. 1) on the pair of rings 10, 12.

As indicated by dashed lines, the fourth web 48 extends in the axial direction between the membrane 14 and a main part of the second threaded ring 12 and has a radial extent equal to the slot width of the adjacent slots 18 and 26. A constriction 50, which is triangular in cross section, extending radially at the second outer circumferential side 34 of the second threaded ring 12, is formed on the fourth web 48 and, accordingly, on the further webs 20, 22 at the first 10 and second threaded ring 12. The constriction 50 effects a stabilization of the webs 20, 22 and 48, which support the membrane 14 deformed during mounting and hold it in its relevant position. FIG. 3 further shows the openings 36 and the female thread 52 continuously arranged along the inner peripheral sides 38 of the two threaded rings 10, 12. Here a machine, structure or equipment part having a matching male thread can be attached by screwing.

Figure 4:
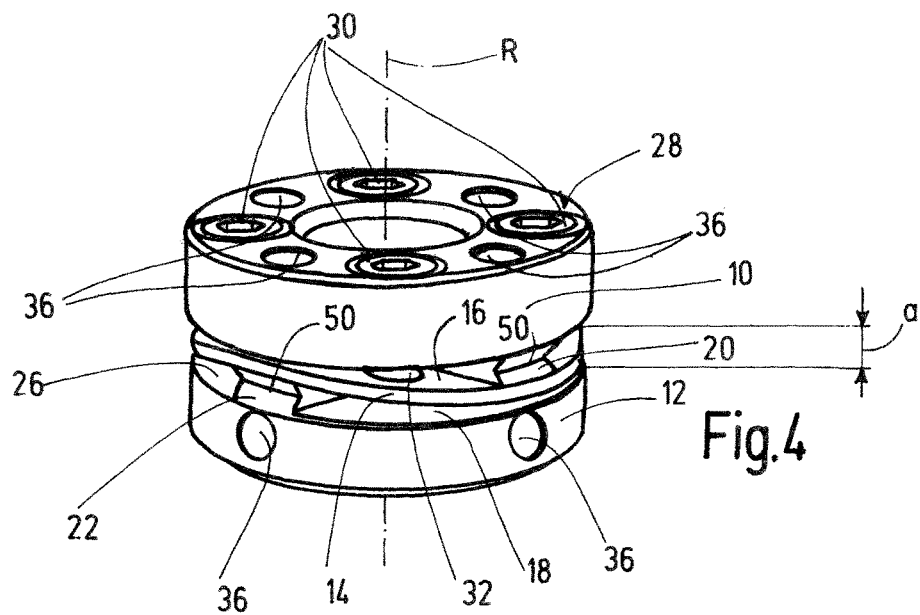
FIG. 4 is a perspective view of the fixing device of FIGS. 1 to 3 in the mounted state i.

FIG. 4 shows the fixing device of FIG. 1 in an mounted state, in which the distance a between the rings 10, 12 of the pair 10, 12 is reduced by tightening the respectively assignable clamping bolts 30 relative to the unmounted state shown in FIG. 1. The membrane 14, which is penetrated by the clamping bolts 30 between two adjacent webs 20, 22, 48, is deformed in the mounted state such that the membrane 14 in the section between the first web 20 and the second web 22 follows a slanted course, in the representation of FIG. 4 from bottom right to top left. In this way, the two threaded rings 10, 12 are clamped together and clamped to as well as fixed securely to a machine, plant or equipment part. The annular circumferential membrane 14 extends between four webs 20, 22 and 48 (see FIG. 3) along the entire circumference of the pair of rings 10, 12 divided into sections and extends in the mounted state preferably in an undulating manner along the ring shape of the pair of rings 10, 12.

The sections of the membrane 14 have an alternately rising and falling slanted course, which is shown in FIG. 4 for the fourth slot 26 adjoining on the left of the second web 22 and the relevant section of the membrane 14. As a result of the slanted or curved course of the membrane 14 in its mounted state, a uniform application of the clamping force of the clamping bolts 30 to the pair of rings 10, 12 is ensured, and the same axial distance a between the inner sides 40, 42 (cf. FIG. 3) of the threaded rings 10, 12 is formed. The deformation of the membrane 14 is shown in an exaggerated manner in FIG. 4. It is understood that both in the unmounted state of FIG. 1 and in the mounted state of FIG. 4, the end faces 28 are oriented plane-parallel to each other at the top of the first threaded ring 10 and at the underside of the second threaded ring 12.

FIGS. 1 and 4 illustrate that the slots 16, 18, 24, 26 extend between the membrane 14 and an adjacent ring 10, 12 and between two of its adjacent webs 20, 22, 48 in an alternating manner, assigned to the one ring 10 at one time and to the other ring 12 at another time. In the first exemplary embodiment shown, the webs 20, 22, 48 are arranged in the center of the adjacent slot 16, 18, 24, 26—viewed in the circumferential direction—and there are integrally connected to the membrane 14. A clamping bolt 30 also extends centrally through the membrane 14 at a passage opening 32 between two adjacent webs 20, 22, 48 and subsequently through the adjacent slots 16, 18, 24, 26. Due to the deformation of the membrane 14 in its mounted state, the smallest distance between a web 20, 22, 48 of a ring 10, 12, on which the membrane 14 is articulated, and the opposite ring 10, 12 is formed at this point. In the representation of FIG. 4, the respective rings 10, 12 are almost brought into contact with the membrane 14 otherwise spaced apart by the associated slot 16, 18, 24, 26 at the webs 20, 22, 48 as the respective proximity points.

Figure 5:
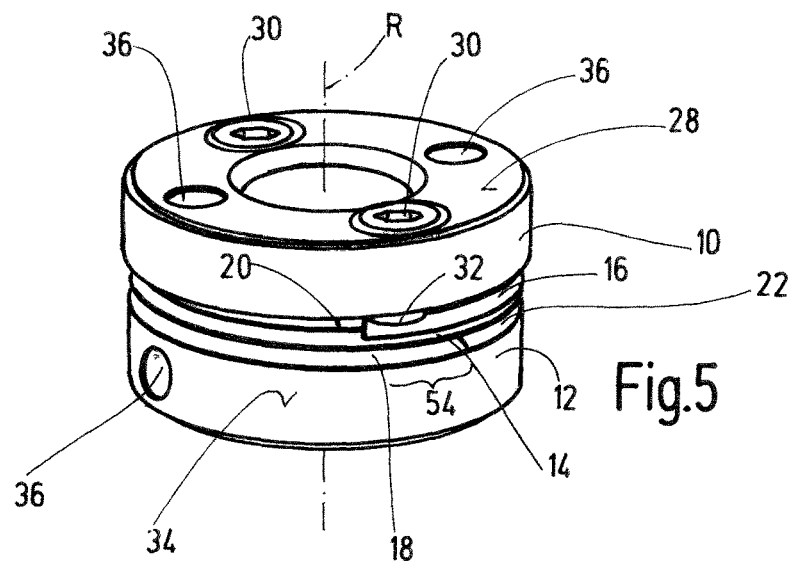
FIG. 5 is a perspective view of a second exemplary embodiment of a fixing device according to the invention.
Figure 6:
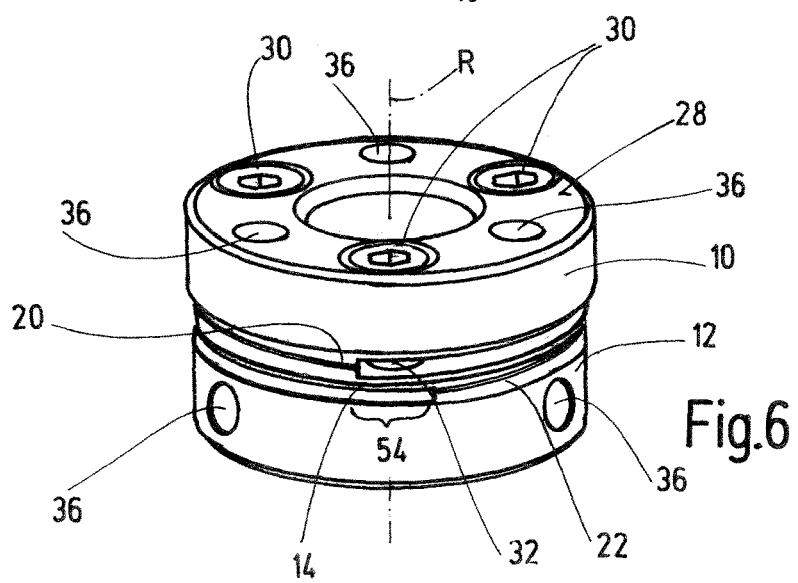
FIG. 6 is a perspective view of a third exemplary embodiment of a fixing device according to the invention.

FIGS. 5 and 6 each show in perspective side view second and third exemplary embodiments, respectively, of the fixing device in the unmounted state. The second exemplary embodiment of FIG. 5 differs from the first exemplary embodiment shown in FIG. 1, in that two clamping bolts 30 and only two slots 16, 18 are inserted into the pair of rings 10, 12. In two ring segments 54 of the pair of rings 10, 12, in each of which both slots 16, 18 extend along the circumference, the respective clamping bolt 30 passes through the first slot 16, the membrane 14 at the respective passage opening 32 and the second slot 18. The first slot 16 of the first web 20 adjoins the one ring segment 54 shown in FIG. 5 and the second web 22 adjoins the second slot 18. The first slot 16 extends—in FIG. 5 to the left—over an angle of 180° degrees from the shown ring segment 54 having one clamping bolt 30 to the other ring segment having the other clamping bolt 30, not shown in FIG. 5. Accordingly, the second slot 18 extends—in FIG. 5 to the right—from the ring segment 54 to the other ring segment on the opposite side of the pair of rings 10, 12. Both webs 20, 22 have a constriction 50 in the radial direction (cf. FIGS. 3, 4). Two openings 36 each are provided at the end faces 28 of the threaded rings 10, 12 and on the second outer peripheral side 34 of the second threaded ring 12. When tightening the clamping bolts 30, the two rings 10, 12 are moved towards each other in the axial direction along the longitudinal axis R, and the membrane 14 is deformed starting from the clamping bolts 30 engaging with the membrane in the ring segments 54 to form at least one slanted or arc course.

The third exemplary embodiment shown in FIG. 6 differs from the first and second exemplary embodiments in that three clamping bolts 30 and three slots 16, 18 are formed on the fixing device. The clamping screw 30 shown in the representation of FIG. 6 passes through the slots 16, 18 in the ring segment 54 and through the membrane 14 at the one passage opening 32. The two further tensioning screws 30 pass through the first 16 or second slot 18, respectively, and through a third slot not shown in FIG. 6 and through the membrane 14 separating them from each other at yet another further passage opening. Further, three openings 36 each are provided on the end faces 28 of the threaded rings 10, 12 and three openings 36 each are provided on the second outer peripheral side 34 of the second threaded ring 12. In all three exemplary embodiments, the same number of openings 36 are formed on the end face of the second threaded ring 12, not shown, as on the end face 28 of the first threaded ring 10.

It will be appreciated that arrangements having more clamping bolts 30 and more or fewer slots 16, 18, 24 and 26 may be provided at the pair of rings 10, 12 according to the invention. The number of clamping bolts may differ from the number of slots. Also, not all clamping bolts need to be arranged outside the webs, which limit a gap to the next ring with the latter.

While various embodiments have been chosen to illustrate the invention, it will be understood by those skilled in the art that various changes and modifications can be made therein without departing from the scope of the invention as defined in the appended claims.

The invention claimed is:

1. A fixing device, comprising:
   first and second threaded rings having rectilinear slots introduced therein with all of the slots opening to an outside of the first and second threaded rings and having partially annularly extending webs between the slots;
   a membrane held between the first and second threaded rings, the membrane being an integral part of the first and second threaded rings and being kept at a distance from the first and second threaded rings by the slots in an unmounted state of the first and second threaded rings; and
   a first clamping bolt usable to adjust the axial distance between the first and second threaded rings, the clamping bolt passing through the membrane between an adjacent pair of the webs, in the unmounted state of the first and second threaded rings the membrane being undeformed and parallel to the first and second threaded rings, in a mounted state of the first and second threaded rings the membrane being moved between the webs and deformed in a direction of at least one of the first and second threaded rings to at least partially form a slanted or arc course as soon as a distance between the first and second threaded rings is reduced by the first clamping bolt, the first clamping bolt passing through the membrane and passing through an adjacent pair of the slots that are separated from and on opposite sides of the membrane.

2. The fixing device according to claim 1 wherein the membrane comprises a plate having a thickness when undeformed matching or being smaller than a width of one of the slots.

3. The fixing device according to claim 1 wherein each of the slots extend continuously from an outside of to an inside of and between the respective adjacent pair of the webs of the first and second threaded rings on an outer peripheral side of the first and second threaded rings by sawing.

4. The fixing device according to claim 1 wherein in an alternating manner, the slots and the respective adjacent pair of the webs of the first threaded ring extend between the membrane and the first threaded ring followed by the slots and the respective adjacent pair of the webs of the second threaded ring extend between the membrane and the second threaded ring.

5. The fixing device according to claim 1 wherein the membrane oriented in parallel to the first and second threaded rings in the unmounted state is deformed by a clamping force input of the first clamping bolt reducing the distance between the first and second threaded rings such that the membrane undulates in the mounted state.

6. The fixing device according to claim 5 wherein the membrane has a uniform wave shape along the ring shape of the first and second threaded rings.

7. The fixing device according to claim 1 wherein the membrane is divided into sections between each adjacent pair of the webs of the first and second threaded rings and has an alternately rising and falling of the slanted or arc course between the adjacent pair of the webs in the mounted state.

8. The fixing device according to claim 1 wherein the first and second threaded rings are additionally connected by a second clamping bolt and have first and second slots therein.

9. The fixing device according to claim 8 wherein the first and second threaded rings are additionally connected by a third clamping bolt and additionally have a third slot therein.

10. The fixing device according to claim 9 wherein the first and second threaded rings are additionally connected by a fourth clamping bolt and additionally have a fourth slot therein.

11. The fixing device according to claim 1 wherein in the mounted state of the membrane, a smallest distance between the webs of the first threaded ring, on which the membrane is articulated, and the second threaded ring is at a point of membrane articulation on the webs of the first threaded ring.

12. The fixing device according to claim 1 wherein the first and second threaded rings have a continuous female thread on inner peripheral sides thereof.

13. The fixing device according to claim 12 wherein the continuous female thread has an equal pitch in the first and second threaded rings.

14. The fixing device according to claim 12 wherein the membrane has a free inner diameter larger than the continuous female thread.

15. The fixing device according to claim 1 wherein one of the first and second threaded rings is an adjusting nut; and
the other of the first and second threaded rings is a lock nut.

16. The fixing device according to claim 15 wherein all of the slots have identical widths; and
the clamping bolt is introduced from a free end face of the locking nut and can be brought in engagement with the adjusting nut.

17. The fixing device according to claim 1 wherein each of the first and second threaded rings comprises a hollow cylinder with a cavity extending along a longitudinal axis bearing threaded section and forms an envelope equipped with slots extending transverse to the longitudinal axis, the membrane extending between the first and second threaded rings, being supported in an alternating sequence by the webs and being articulated multiple times via articulation points alternating in directions toward the first and second threaded rings.

18. The fixing device according to claim 1 wherein the first and second threaded rings have differing outer diameters forming a stepped arrangement.

19. The fixing device according to claim 1 wherein outer peripheral hinge points of the webs extend between the first and second threaded rings and the membrane.

20. The fixing device according to claim 1 wherein the webs are provided with contour changes forming constrictions adjusting inherent rigidity thereof along outer circumferences thereof.

* * * * *